(12) United States Patent
Osotsi et al.

(10) Patent No.: US 12,541,722 B2
(45) Date of Patent: Feb. 3, 2026

(54) MACHINE LEARNING TECHNIQUES FOR VALIDATING AND MUTATING OUTPUTS FROM PREDICTIVE SYSTEMS

(71) Applicant: Optum, Inc., Minnetonka, MN (US)

(72) Inventors: Ame Osotsi, University Park, PA (US); Sae Goon Lee, Seattle, WA (US); Jason R Robinson, La Jolla, CA (US)

(73) Assignee: Optum, Inc., Minnetonka, MN (US)

( * ) Notice: Subject to any disclaimer, the term of this patent is extended or adjusted under 35 U.S.C. 154(b) by 566 days.

(21) Appl. No.: 18/081,242

(22) Filed: Dec. 14, 2022

(65) Prior Publication Data
US 2024/0202604 A1    Jun. 20, 2024

(51) Int. Cl.
*G06N 20/20*    (2019.01)

(52) U.S. Cl.
CPC .................................. *G06N 20/20* (2019.01)

(58) Field of Classification Search
CPC ..................................................... G06N 20/20
See application file for complete search history.

(56) References Cited

U.S. PATENT DOCUMENTS

| | | | |
|---|---|---|---|
| 8,005,720 B2 | 8/2011 | King et al. | |
| 9,129,290 B2 | 9/2015 | Kannan et al. | |
| 9,342,741 B2 | 5/2016 | Amtrup et al. | |
| 10,198,635 B2 | 2/2019 | Chen et al. | |
| 10,963,893 B1 | 3/2021 | Sharma | |
| 11,188,840 B1 | 11/2021 | Rivera et al. | |
| 11,341,126 B2 | 5/2022 | Panuganty et al. | |
| 2011/0099047 A1 | 4/2011 | Weiss et al. | |
| 2016/0042298 A1 | 2/2016 | Liang et al. | |
| 2017/0178153 A1 | 6/2017 | Meng et al. | |
| 2018/0285969 A1 | 10/2018 | Busch et al. | |
| 2018/0349327 A1 | 12/2018 | Yang et al. | |
| 2018/0349447 A1 | 12/2018 | MacCartney et al. | |
| 2018/0349472 A1 | 12/2018 | Kohlschuetter et al. | |
| 2019/0156210 A1 | 5/2019 | He et al. | |

(Continued)

FOREIGN PATENT DOCUMENTS

| | | |
|---|---|---|
| CN | 113095088 A | 7/2021 |
| WO | 2022/006474 A1 | 1/2022 |

OTHER PUBLICATIONS

Gu, Jiatao, Changhan Wang, and Junbo Zhao. "Levenshtein transformer." Advances in neural information processing systems 32 (2019). (Year: 2019).*

(Continued)

*Primary Examiner* — Michael J Huntley
*Assistant Examiner* — Sehwan Kim
(74) *Attorney, Agent, or Firm* — Alston & Bird LLP

(57) ABSTRACT

Various embodiments of the present disclosure provide methods, apparatus, systems, computing devices, computing entities, and/or the like for revising classifier predictions, wherein classification labels are tokenized according to an index of predefined classification labels. An embedding is created for each token using an embedding model. The embeddings are provided to a machine learning model that accepts a sequence of tokens as input and produces a sequence of tokens as output. Tokens are extracted from the output of the machine learning model and a classification label corresponding to each token is retrieved according to the index of predefined classification labels.

20 Claims, 12 Drawing Sheets

(56) References Cited

U.S. PATENT DOCUMENTS

| | | |
|---|---|---|
| 2019/0349321 A1 | 11/2019 | Cai et al. |
| 2020/0210647 A1 | 7/2020 | Panuganty et al. |
| 2020/0279271 A1 | 9/2020 | Gasperecz et al. |
| 2020/0320548 A1 | 10/2020 | Fusillo et al. |
| 2021/0067527 A1 | 3/2021 | Chen et al. |
| 2021/0201338 A1 | 7/2021 | Konig et al. |
| 2021/0365467 A1 | 11/2021 | Nazeer et al. |
| 2023/0273974 A1 | 8/2023 | Robinson et al. |

OTHER PUBLICATIONS

Hua, Xinyu, and Lu Wang. "PAIR: Planning and iterative refinement in pre-trained transformers for long text generation." arXiv preprint arXiv:2010.02301 (2020). (Year: 2020).*

Gui, Tao, et al. "Leveraging document-level label consistency for named entity recognition." Proceedings of the Twenty-Ninth International Conference on International Joint Conferences on Artificial Intelligence. 2021. (Year: 2021).*

Gui, Tao, et al. "Uncertainty-aware label refinement for sequence labeling." arXiv preprint arXiv:2012.10608 (2020). (Year: 2020).*

Blum, Avrim L. et al. "Selection of Relevant Features and Examples in Machine Learning," Artificial Intelligence, vol. 97, vol. 1-2, pp. 245-271 Dec. 1, 1997.

Britannica, The Editors of Encyclopaedia. "Warren Weaver". Encyclopedia Britannica, Nov. 20, 2022, (5 pages), [Retrieved from the Internet Mar. 28, 2023] <URL: https://www.britannica.com/biography/Warren-Weaver>.

Devlin, Jacob et al. "BERT: Pre-Training of Deep Bidirectional Transformers for Language Understanding," arXiv PrePrint arXiv:1810.04805v2 [cs.CL], May 24, 2019, (16 pages).

Gasparetti, Fabio et al. "Prerequisites Between Learning Objects: Automatic Extraction Based on a Machine Learning Approach," Telematics and Informatics, vol. 35, No. 3, pp. 595-610, Jun. 1, 2018.

Hadiyat, M.A. "Combined Structural Equation Modelling—Artificial Neural Networks Model for Predicting Customer Loyalty," International Conference on Informatics, Technology and Engineering, IOP Conference Series: Materials Science and Engineering, vol. 703, No. 1: 012024, Nov. 1, 2019, pp. 1-7, IOP Publishing, DOI: 10.1088/1757-899X/703/1/012024.

Hannun, Awni Y. et al. "Cardiologist-Level Arrhythmia Detection and Classification in Ambulatory Electrocardiograms Using a Deep Neural Network," Nature Medicine, vol. 25, pp. 65-69, Jan. 7, 2019, DOI: 10.1038/s41591-018-0268-3.

Haupt, Johannes Sebastian. "Machine Learning For Marketing Decision Support," Doctoral Thesis, Humboldt-Universitat Zu Berlin, School of Business and Economics, Jun. 24, 2020, (287 pages), available on Internet: https://edoc.hu-berlin.de/bitstream/handle/18452/22318/dissertation_haupt_johannes.pdf?sequence=6.

He, Kaiming et al. "Deep Residual Learning for Image Recognition," arXiv PrePrint arXiv:1512.03385v1 [cs.CV], Dec. 10, 2015, pp. 1-12.

Kipf, Thomas N. et al. "Semi-Supervised Classification With Graph Convolutional Networks," arXiv PrePrint arXiv:1609.02907v4 [cs, KG], Feb. 22, 2017, pp. 1-14.

Levy, Matt. "Predicting Customer Behavior Using Data Science Starts Here," Analytics 8, Mar. 25, 2021, (8 pages), (article, online), [Retrieved from the Internet Feb. 2, 2022] <URL: https://www.analytics8.com/blog/predicting-customer-behavior-using-data-science/>.

Rajpurkar, Pranav et al. "Cardiologist-Level Arrhythmia Detection With Convolutional Neural Networks," arXiv:1707.01836v1 [cs.CV], Jul. 6, 2017, (9 pages), [Retrieved from the Internet Mar. 28, 2023] <URL: https://arxiv.org/pdf/1707.01836.pdf>.

Sun, Xu et al. "Feature-Frequency-Adaptive On-Line Training for Fast and Accurate natural Language Processing," Association for Computational Linguistics, vol. 40, No. 3, pp. 563-586, Sep. 1, 2014, DOI: 10.1162/COLL_a_00193.

Yang, Fangkai et al. Group Behavior Recognition Using Attention- and Graph-Based Neural Networks, In ECAI 2020 (Year: 2020), pp. 1626-1633, IOS Press, Doi: 10.3233./FAIA200273.

Carmo, Paulo Do, et al., "Embedding propagation over heterogeneous event networks for link prediction", 2021 IEEE International Conference on Big Data, Dec. 15-18, 2021, pp. 4812-4821, DOI: 10.1109/BigData52589.2021.9671645, downloaded on Jun. 12, 2025 from IEEE Xplore.

Examiner Interview Summary Record (PTOL - 413) Mailed on Sep. 12, 2025 for U.S. Appl. No. 17/663,966, 2 page(s).

Letham, Benjamin, et al., "Sequential event prediction", Mach Learn, published online Jun. 8, 2013, pp. 357-380, vol. 93, Springer (DOI 10.1007/s10994-013-5356-5).

Levin, Oscar, "Discrete Mathematics: An Open Introduction", printed Jan. 7, 2021, 3rd Edition, pp. 81-88, retrieved from the Internet at http://discrete.openmathbooks.org.

Non-Final Rejection Mailed on Jun. 25, 2025 for U.S. Appl. No. 17/663,966, 114 page(s).

Yang, Bishan, et al., "Embedding Entities and Relations for Learning and Inference in Knowledge Bases", submitted Aug. 29, 2015 to Cornell University Library Online Archive, retrieved from the Internet at https://arxiv.org/pdf/1412.6575, 12 pages.

Final Rejection Mailed on Dec. 18, 2025 for U.S. Appl. No. 17/663,966, 58 page(s).

* cited by examiner

MACHINE LEARNING TECHNIQUES FOR VALIDATING AND MUTATING OUTPUTS FROM PREDICTIVE SYSTEMS

BACKGROUND

Various embodiments of the present disclosure address technical challenges related to performing predictive data analysis and provide solutions to address the efficiency and reliability shortcomings of existing predictive data analysis solutions.

BRIEF SUMMARY

In general, various embodiments of the present disclosure provide methods, apparatus, systems, computing devices, computing entities, and/or the like for processing predictive system output.

In accordance with one aspect, a method is provided. In one embodiment, the method comprises: receiving, by a computing device and originating from a predictive system, predictive output data, the predictive output data comprising a plurality classification labels; generating, by the computing device, an input sequence of tokens, the input sequence of tokens comprising a tokenization of the plurality of classification labels based at least in part on an index of predefined classification labels; generating, by the computing device and using a prediction validation machine learning framework, a mutation of the input sequence of tokens, wherein: the prediction validation machine learning framework comprises an embedding machine learning model and a mutation machine learning model, wherein: (i) the embedding machine learning model is configured to (a) generate, for each token of the input sequence of tokens, a token embedding, and (b) concatenate each token embedding into a token embedding matrix, (ii) the mutation machine learning model is configured to generate an output matrix, comprising an output sequence of tokens, based at least in part on the token embedding matrix, (iii) the mutation of the input sequence of tokens comprises retrieval of one or more output classification labels associated with the output sequence of tokens based at least in part on the index of predefined classification labels; and performing, by the computing device, one or more prediction-based actions based at least in part on the mutation of the input sequence of tokens.

In accordance with another aspect, an apparatus comprising at least one processor and at least one memory including computer program code is provided. In one embodiment, the at least one memory and the computer program code may be configured to, with the processor, cause the apparatus to: receive predictive output data from a predictive system, the predictive output data comprising a plurality classification labels; generate an input sequence of tokens, the input sequence of tokens comprising a tokenization of the plurality of classification labels based at least in part on an index of predefined classification labels; generate, using a prediction validation machine learning framework, a mutation of the input sequence of tokens, wherein: the prediction validation machine learning framework comprises an embedding machine learning model and a mutation machine learning model, wherein: (i) the embedding machine learning model is configured to (a) generate, for each token of the input sequence of tokens, a token embedding, and (b) concatenate each token embedding into a token embedding matrix, (ii) the mutation machine learning model is configured to generate an output matrix, comprising an output sequence of tokens, based at least in part on the token embedding matrix, (iii) the mutation of the input sequence of tokens comprises retrieval of one or more output classification labels associated with the output sequence of tokens based at least in part on the index of predefined classification labels; and perform one or more prediction-based actions based at least in part on the mutation of the input sequence of tokens.

In accordance with yet another aspect, a computer program product is provided. The computer program product may comprise at least one computer-readable storage medium having computer-readable program code portions stored therein, the computer-readable program code portions comprising executable portions configured to: receive predictive output data from a predictive system, the predictive output data comprising a plurality classification labels; generate an input sequence of tokens, the input sequence of tokens comprising a tokenization of the plurality of classification labels based at least in part on an index of predefined classification labels; generate, using a prediction validation machine learning framework, a mutation of the input sequence of tokens, wherein: the prediction validation machine learning framework comprises an embedding machine learning model and a mutation machine learning model, wherein: (i) the embedding machine learning model is configured to (a) generate, for each token of the input sequence of tokens, a token embedding, and (b) concatenate each token embedding into a token embedding matrix, (ii) the mutation machine learning model is configured to generate an output matrix, comprising an output sequence of tokens, based at least in part on the token embedding matrix, (iii) the mutation of the input sequence of tokens comprises retrieval of one or more output classification labels associated with the output sequence of tokens based at least in part on the index of predefined classification labels; and perform one or more prediction-based actions based at least in part on the mutation of the input sequence of tokens.

BRIEF DESCRIPTION OF THE DRAWINGS

Figure 1:
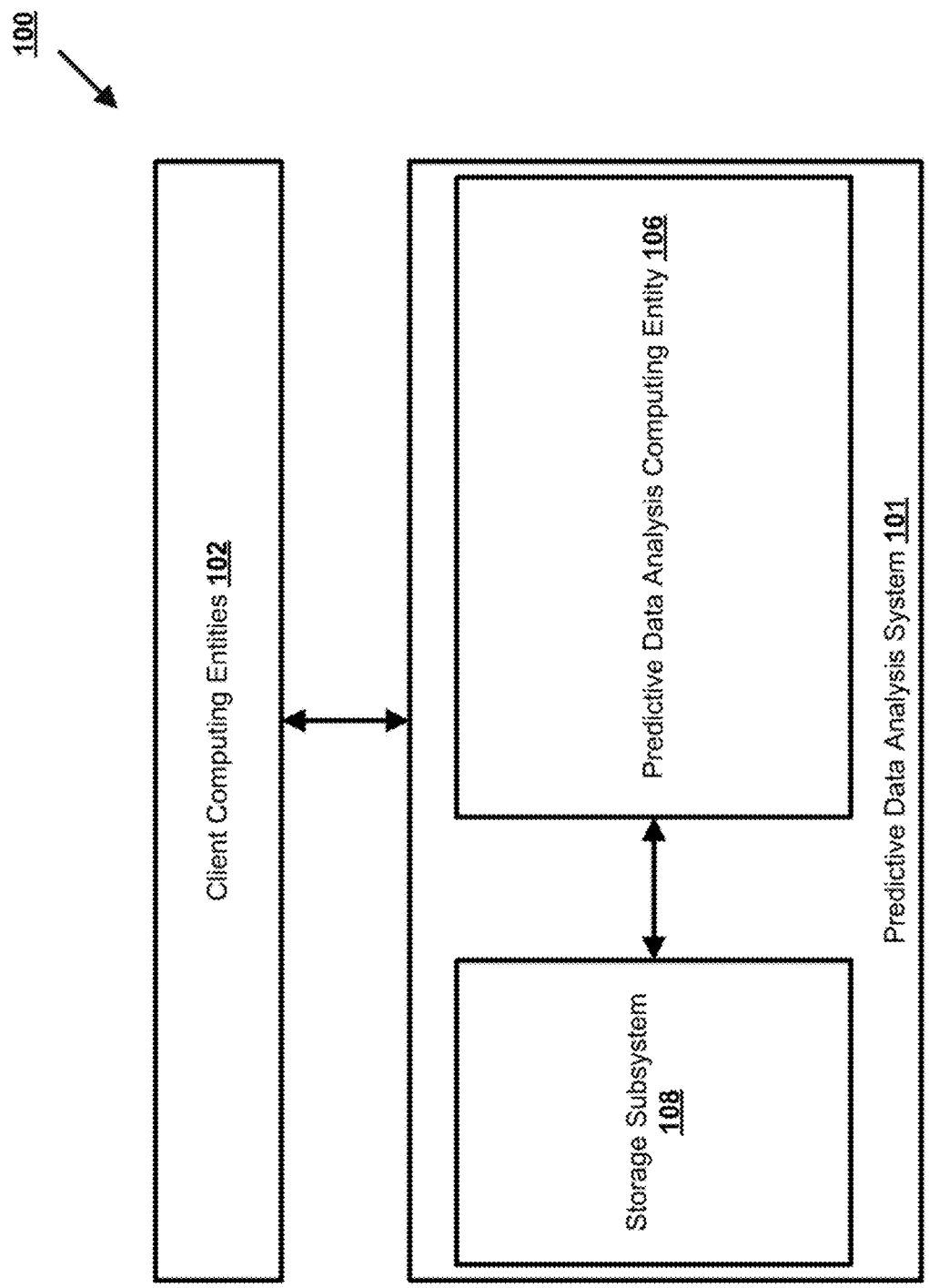

Having thus described the disclosure in general terms, reference will now be made to the accompanying drawings, which are not necessarily drawn to scale, and wherein:

FIG. 1 provides an exemplary overview of an architecture that can be used to practice embodiments of the present disclosure.

Figure 2:
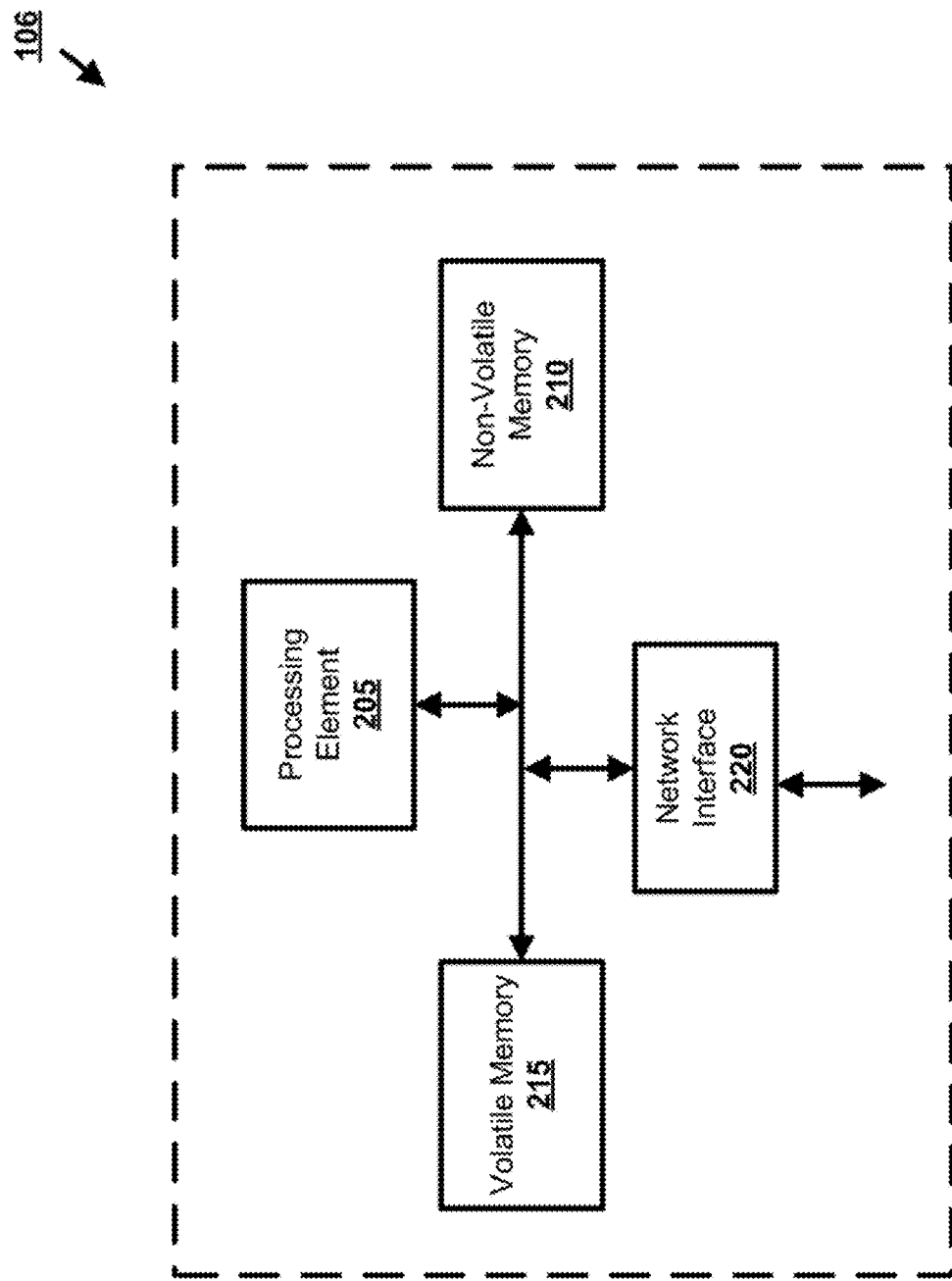

FIG. 2 provides an example predictive data analysis computing entity in accordance with some embodiments discussed herein.

Figure 3:
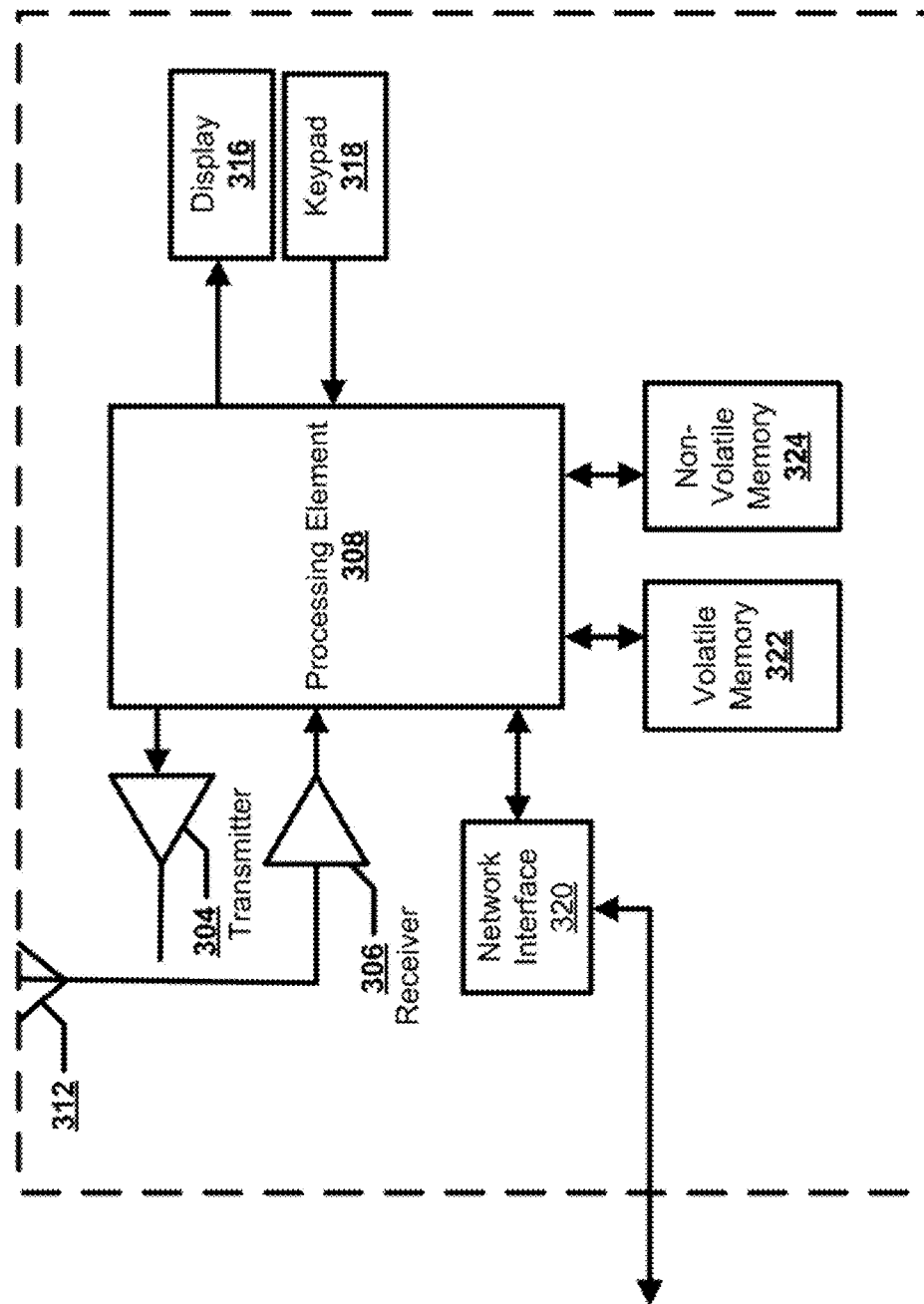

FIG. 3 provides an example client computing entity in accordance with some embodiments discussed herein.

Figure 4:
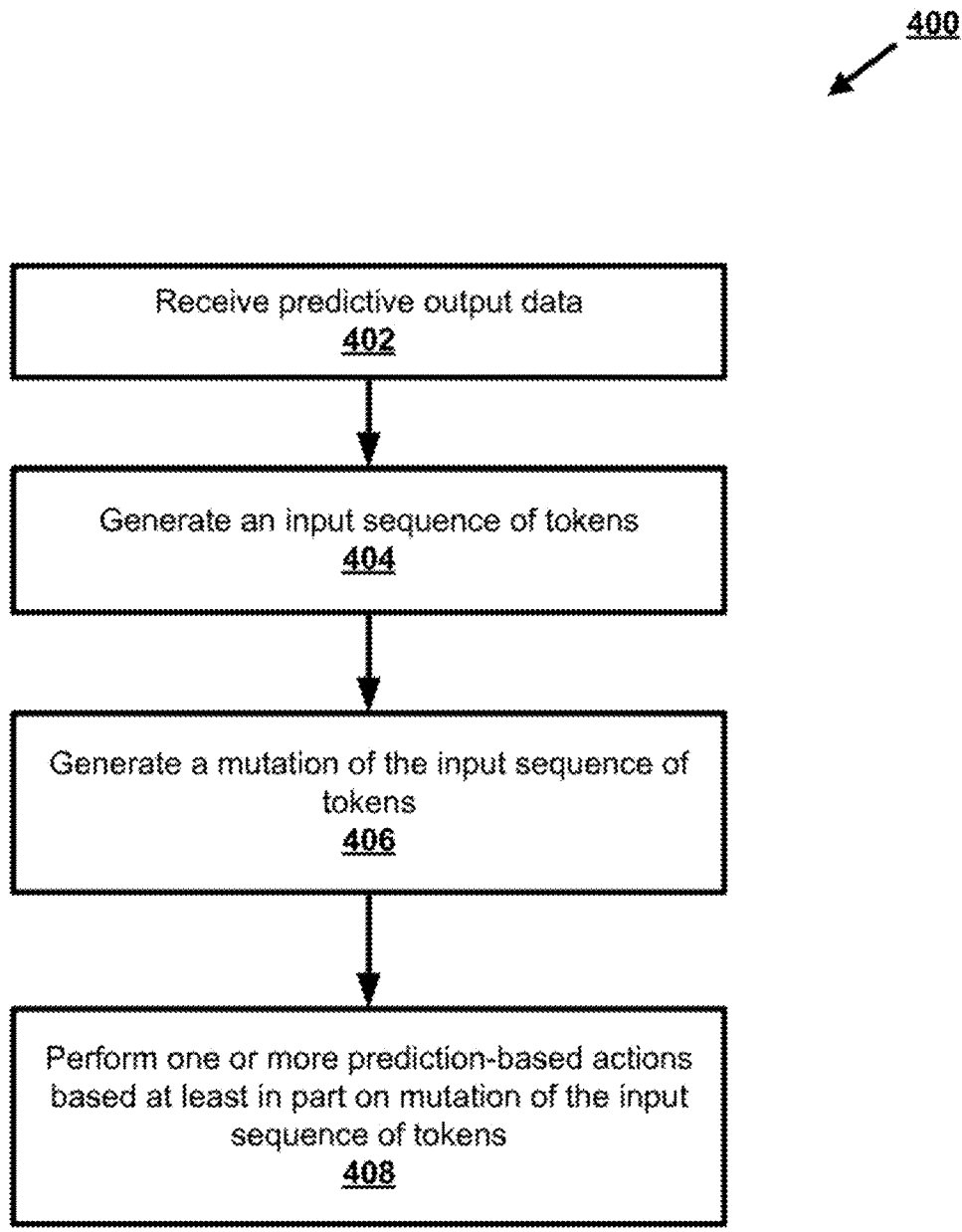

FIG. 4 is a flowchart diagram of an example process for processing predictive system output in accordance with some embodiments discussed herein.

Figure 5:
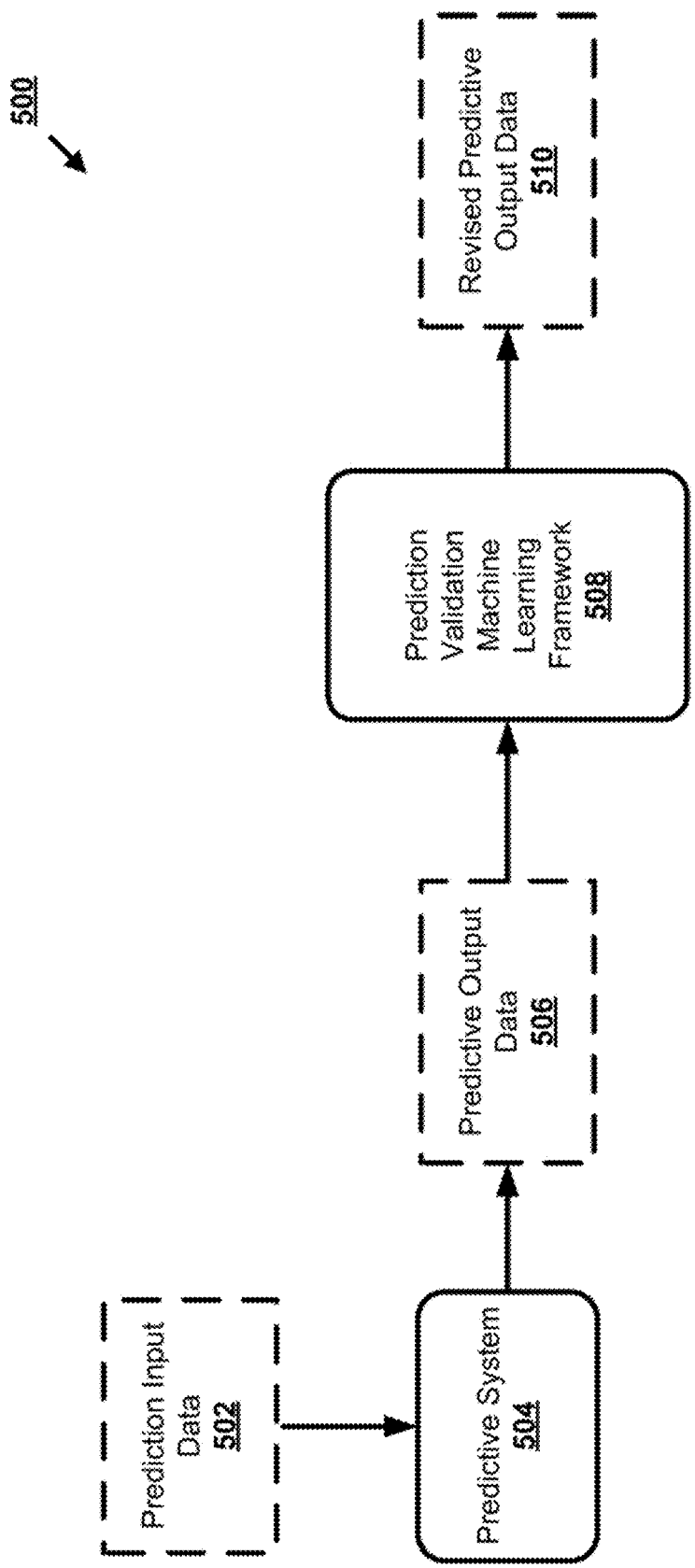

FIG. 5 provides an operational example of a predictive data processing system in accordance with some embodiments discussed herein.

Figure 6:
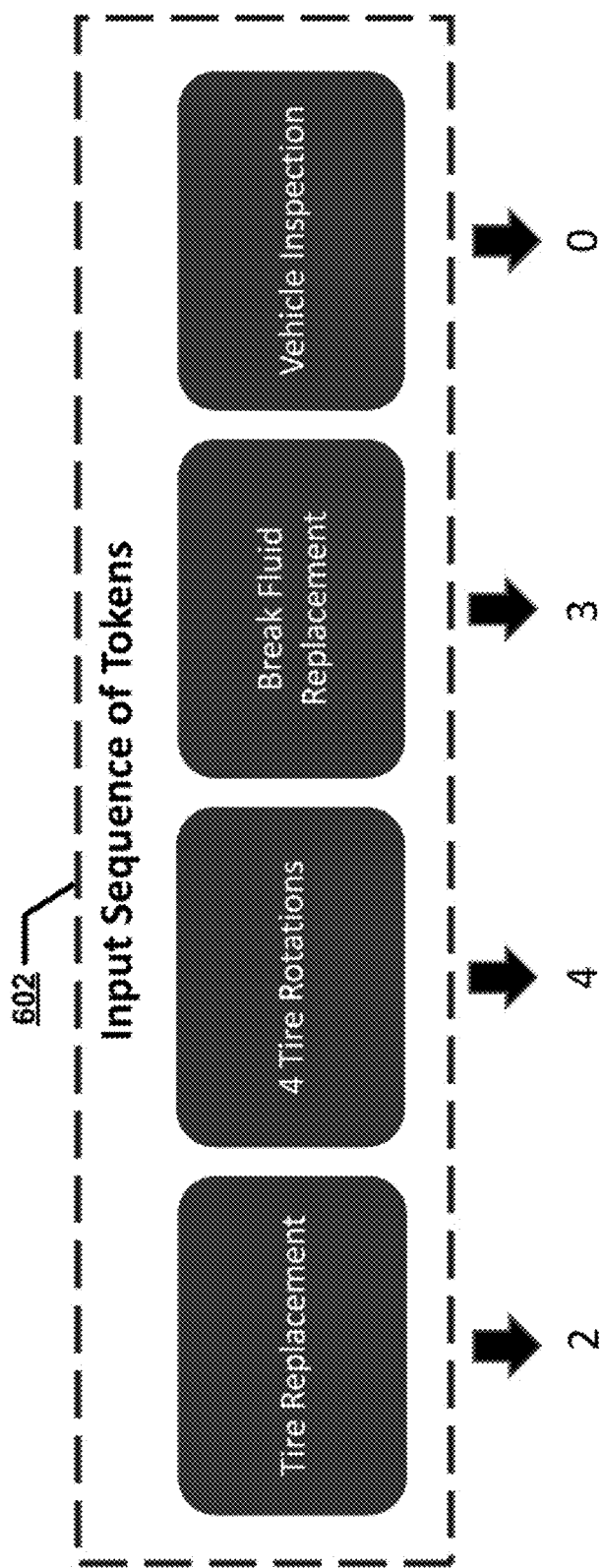

FIG. 6 provides an operational example of an input sequence of tokens in accordance with some embodiments discussed herein.

Figure 7:
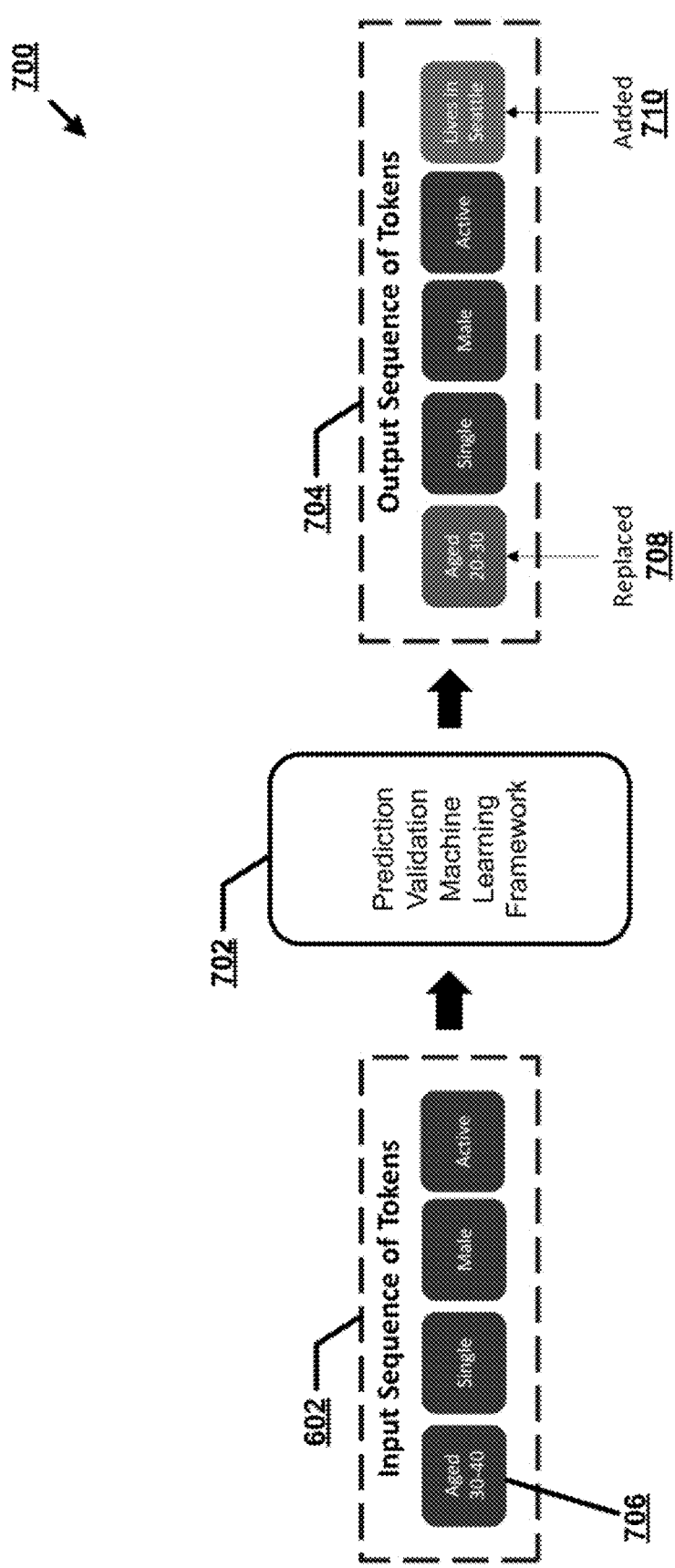

FIG. 7 provides an operational example of performing a mutation of an input sequence of tokens in accordance with some embodiments discussed herein.

Figure 8:
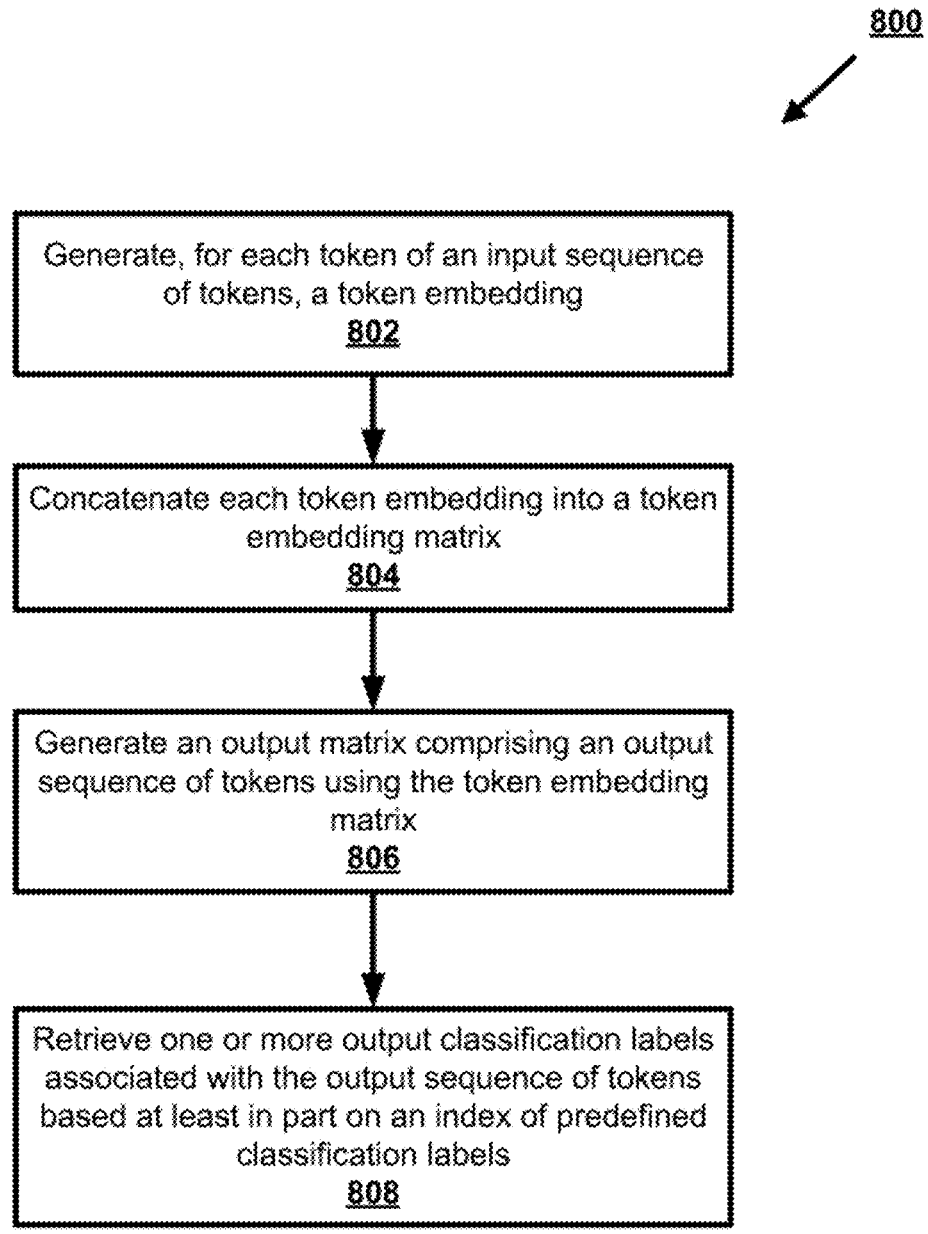

FIG. 8 is a flowchart diagram of an example process for mutating an input sequence of tokens in accordance with some embodiments discussed herein.

Figure 9:
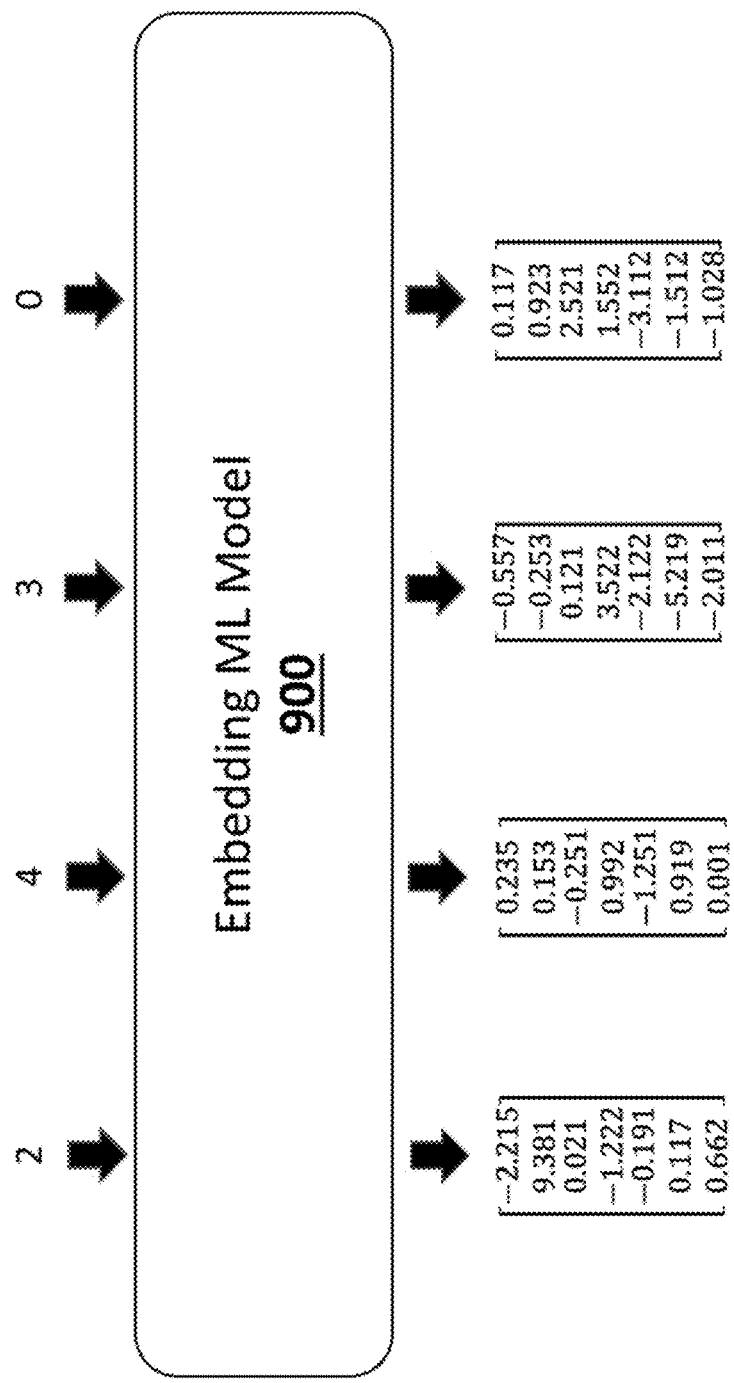

FIG. 9 provides an operational example of embedding machine learning model in accordance with some embodiments discussed herein.

Figure 10:
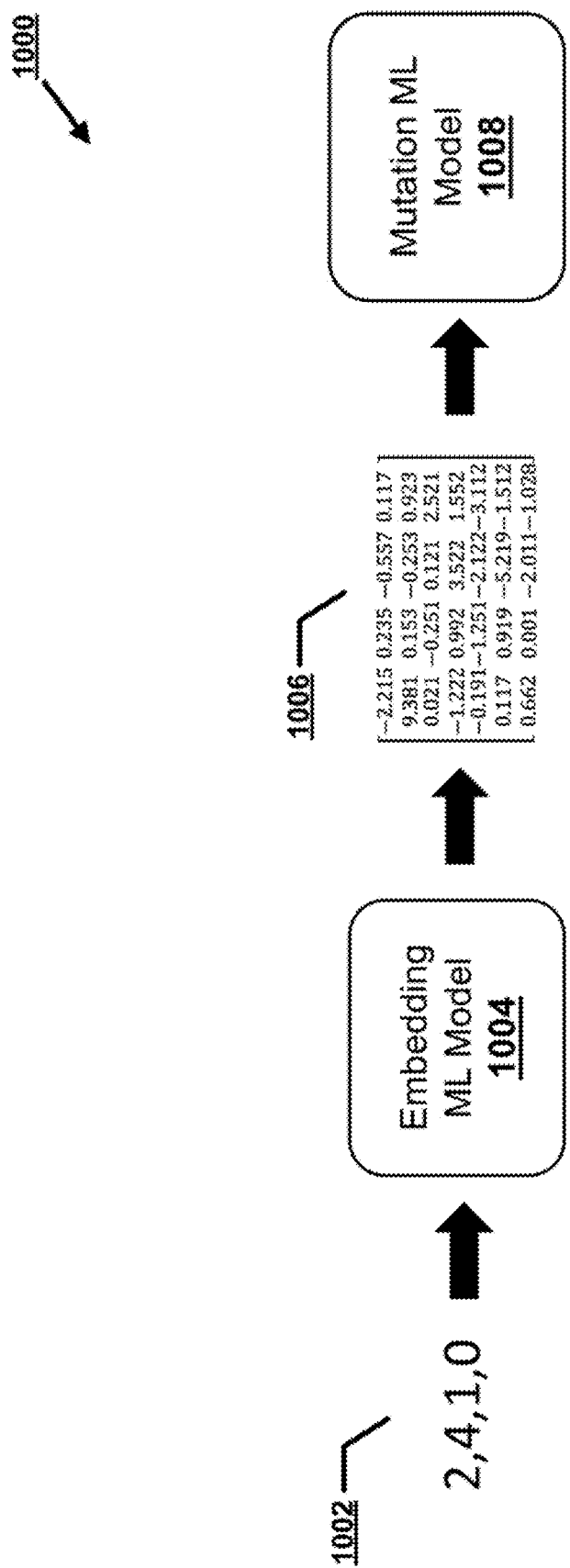

FIG. 10 provides an operational example of a mutation workflow in accordance with some embodiments discussed herein.

Figure 11:
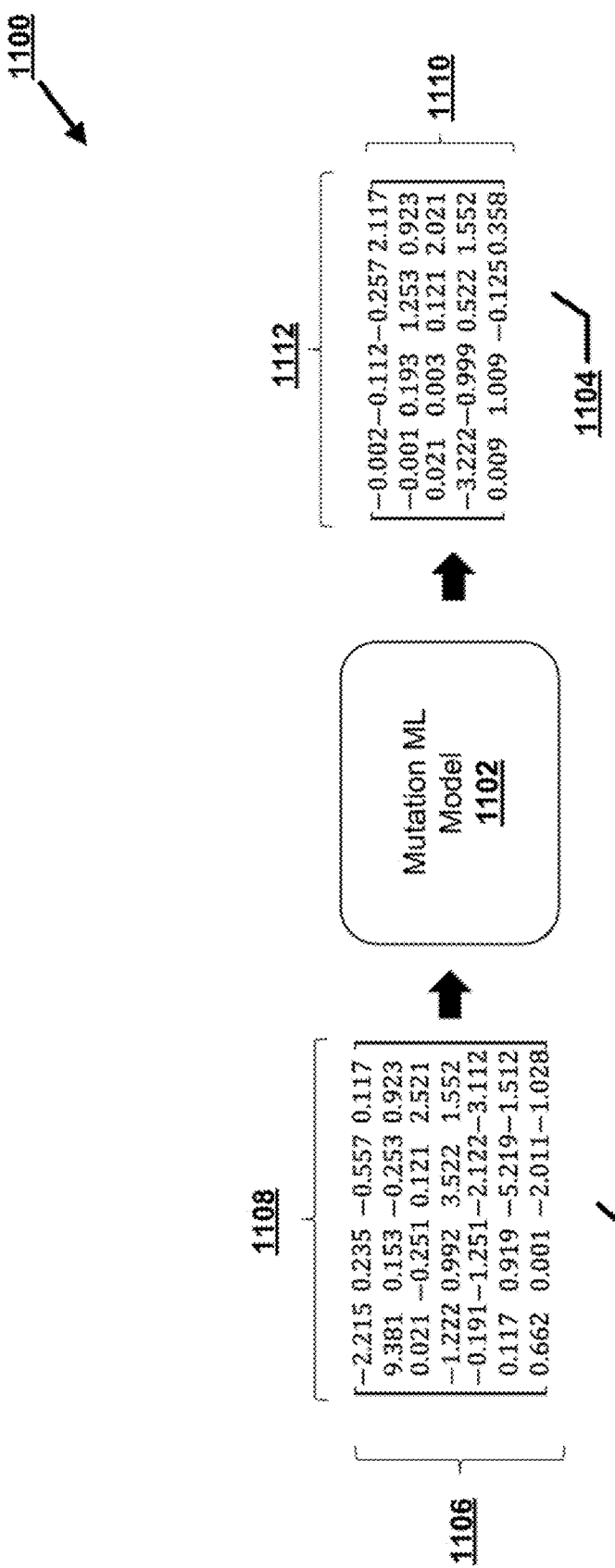

FIG. 11 provides an operational example of a mutation machine learning model workflow in accordance with some embodiments discussed herein.

Figure 12:
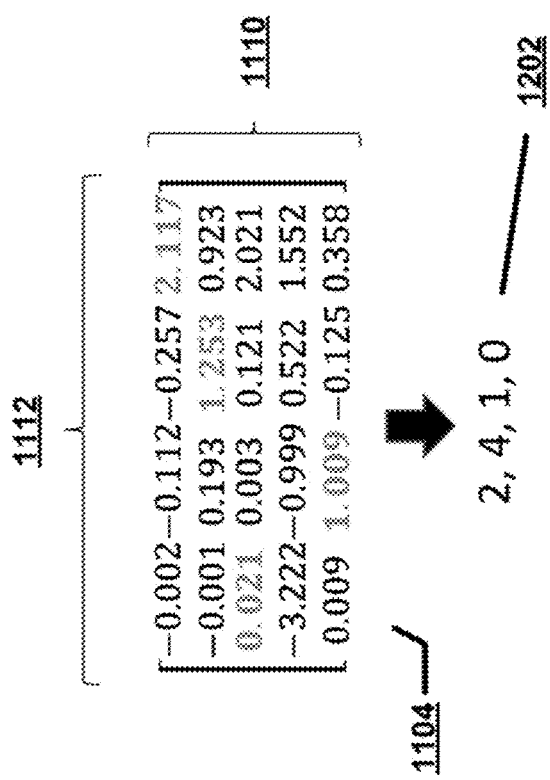

FIG. 12 provides an operational example of an output matrix in accordance with some embodiments discussed herein.

DETAILED DESCRIPTION

Various embodiments of the present disclosure now will be described more fully hereinafter with reference to the accompanying drawings, in which some, but not all, embodiments of the disclosures are shown. Indeed, these disclosures may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present disclosure are described with reference to predictive data analysis, one of ordinary skill in the art will recognize that the disclosed concepts can be used to perform other types of data analysis.

I. OVERVIEW AND TECHNICAL IMPROVEMENTS

Various embodiments of the present disclosure make important technical contributions to improving predictive accuracy of predictive systems, which use predictive machine learning models, by validating and revising predictive output data of the predictive systems with respect to a subset of classification levels from a fixed set of classification labels that are relevant to a given context (e.g., domain, application, system, concept, subject matter, etymology), which in turn improves training speed and training efficiency of training predictive machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training predictive machine learning models.

For example, various embodiments of the present disclosure improve predictive systems including predictive machine learning models by validating and revising predictive output data of the predictive systems with respect to a subset of classification levels from a fixed set of classification labels that are relevant to a given context. As described herein, existing techniques for validating predictive output data require extensive algorithms and algebraic rules. Such algorithms and rules would need to be rewritten and retested for each use-case, e.g., industry, and rely on generating numerous explicit intermediate metrics to measure validity, which also entails more engineering work, computation, and storage needs. Hence, existing systems for validating predictive output data are generally domain-specific, and require extensive need for subject matter expertise, computing resources for modifying and maintaining codebase, and creation of exhaustive tests to validate each individual predictive output data element.

However, in accordance with various embodiments of the present disclosure, a predictive data analysis computing entity may be configured to be highly general and applicable in any domain and used to revise predictive output data, comprising a plurality of classification labels, of predictive systems including predictive machine learning models. The disclosed prediction validation machine learning model framework may be configured to process classification labels in the form of tokens within a mutation process to produce a revised set of classification labels. Accordingly, original potentially faulty predictive output data may be revised to corrected predictive output data by using a mutation machine learning model. If there are no errors in the original predictive output data, the mutation machine learning model may output the original predictive output data as-is. This technique will lead to higher accuracy of performing predictive operations as needed on certain sets of predictive output data. In doing so, the techniques described herein improve efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training predictive machine learning models.

II. DEFINITIONS

The term "predictive output data" may refer to a data construct that describes a prediction result generated by a predictive system. The predictive output data may comprise data representative of a set of predictions or forecasts of prediction input data. Predictive output data may comprise one or more classification labels based at least in part on prediction input data. According to various embodiments of the present disclosure, predictive output data may comprise a plurality of classification labels as a result of a process of predicting a class of data points from prediction input data. The process may comprise, for example, approximating a mapping function $f$ from input variables x to discrete output variables y. An example of predictive output data may comprise a set of predictions, made by a natural language-based predictive model, of billable items from an optical character recognition scan of a handwritten order. According to another example, predictive output data may comprise diagnoses, such as medical codes, e.g., International Statistical Classification of Diseases and Related Health Problems (ICD) codes, Current Procedural Terminology (CPT) codes, prescription (RX) codes that are generated as classification output of electronic medical records data or medical document files. Other examples of predictive output data applicable to a plurality of applications, industries, and domains are described further herewith.

The term "prediction input data" may refer to a data construct that describes data received and used by a predictive system to generate predictive output data. In one embodiment, the prediction input data may comprise historical or existing data that is analyzed by a predictive system to predict one or more classification labels representative of a context of the prediction input data.

The term "predictive system" may refer to a computing system or apparatus comprising at least one processor and at least one memory including program code, wherein the at least one memory and the program code are configured to, with the processor, cause the computing system or apparatus to at least generate predictive output data for given prediction input data. Generating predictive output data by the predictive system may comprise for example, predicting one or more classes or concepts of data, from given prediction input data, whose classification labels are unknown. In some embodiments, a predictive system may analyze prediction input data to create a predictive machine learning model that can be used to generate predictive output data. The predictive machine learning model may be trained to predict, categorize, or identify missing or unavailable data from given prediction input data.

The term "predictive machine learning model" may refer to a data construct that describes parameters, hyperparameters, and/or defined operations of a machine learning model that is configured to generate predictive output data for given prediction input data. According to various embodiments of the present disclosure, a predictive machine learning model may receive prediction input data and perform a predictive inference, such as predicting a class (e.g., assigning classification labels) associated with data points from the prediction input data. For example, a predictive machine learning model may generate a predictive inference associated with ICD codes based at least in part on data from a medical visit data record. A predictive machine learning model may comprise a data object created by using machine learning to learn to perform a given function (e.g., a prediction) through training with a training dataset. For example, a training process may formulate a mapping function $f$ from input variables x to discrete output variables y. A predictive machine learning model may be trained to generate predictive output data by learning from a training dataset. A training dataset may (e.g., supervised learning via labeled data) or may not (e.g., unsupervised learning via unlabeled data) include classification labels that characterize data in the training dataset. As such, a predictive machine learning model may learn known (e.g., supervised) or unknown (e.g., unsupervised) relationships or patterns from a training dataset.

The term "classification label" may refer to a data construct that describes a label that associates target features, properties, or characteristics to data. For example, a classification label may be generated as output from a predictive system or a predictive machine learning model for describing a prediction on given prediction input data. Classification labels may be applied to various kinds of data types such as images, text, audio, video files, and application files that may be used to, for example, train a machine learning model. In some embodiments, classification labels may comprise descriptions, tags, or identifiers that classify or emphasize features present in training data entries which may be analyzed by machine learning models for relationships or patterns to perform a predictive inference.

The term "output classification label" may refer to a data construct that describes a classification label retrieved based at least in part on a de-tokenization of a token from an output sequence of tokens of an output matrix generated by a mutation machine learning model. Output classification labels may be retrieved based at least in part on integer values in the index of predefined classification labels. An output classification label may be representative of a result of revision to predictive output data based at least in part on a mutation of an input sequence of tokens performed by a mutation machine learning model.

The term "prediction validation machine learning framework" may refer to a data construct that describes parameters, hyperparameters, and/or defined operations of a machine learning model that is configured to process predictive output data from predictive systems. The prediction validation machine learning framework may receive an input sequence of tokens comprising a tokenization of a plurality of classification labels from predictive output data of a predictive system. The plurality of classification labels may be tokenized based at least in part on an index of predefined classification labels. The prediction validation machine learning framework may generate a mutation of the input sequence of tokens, where one or more prediction-based actions may be performed based at least in part on one or more output classification labels based at least in part on the mutation of the input sequence of tokens. According to various embodiments of the present disclosure, the prediction validation machine learning framework may comprise an embedding machine learning model and a mutation machine learning model. The embedding machine learning model may be configured to generate, for each token of the input sequence of tokens, a token embedding, and concatenate each token embedding into a token embedding matrix. The mutation machine learning model may be configured to generate an output matrix, comprising an output sequence of tokens, by using the token embedding matrix.

The terms "tokenize" or "tokenization" may refer to an operation that converts a given classification label into a token by using a mapping based at least in part on an index of predefined classification labels. In particular, a tokenized classification label may be represented as a unique identifier according to the mapping. The unique identifier may comprise one or more integers and/or characters. For example, a unique identifier may be formatted according to one or more integer values, binary values, or hexadecimal values. According to various embodiments of the present disclosure, each unique classification label belonging to a defined universal set of classification labels may be assigned a unique identifier in an index of predefined classification labels. That is, each instance of a given classification label is associated with a single unique identifier.

The term "de-tokenize" may refer to an operation that converts a token from an output sequence of tokens to an output classification label by referencing an index of predefined classification labels.

The term "token" may refer to a data construct that describes a representation of a classification label comprising a unique identifier according to a mapping based at least in part on an index of predefined classification labels.

The term "index of predefined classification labels" may refer to a data construct that describes a reference of mappings between classification labels and unique identifiers. For example, an index of predefined classification labels may comprise a lookup table for a defined set of classification labels used by a predictive system. According to various embodiments of the present disclosure, an index of predefined classification labels may define a token key for a set of classification labels for which predictive output data is generated from with respect to given prediction input data. An index of predefined classification labels may be used to tokenize classification labels associated with predictive output data, and to de-tokenize an output sequence of tokens of an output matrix, generated by a mutation machine learning model, by retrieving output classification labels corresponding to tokens of the output sequence of tokens.

The term "input sequence of tokens" may refer to a data construct that describes a set of tokens comprising a series of integers provided to an embedding machine learning model to generate token embeddings. The set of tokens may comprise a tokenization of a plurality of classification labels, where the tokenization is performed based at least in part on an index of predefined classification labels. In one embodiment, an input sequence of tokens may comprise a set of tokens that are arranged in a specific order. For example, depending on the nature of given classification labels, some intuitive orderings may be used to arrange tokens within a given input sequence of tokens. As such, if a set of classification labels are events in time, a corresponding input sequence of tokens may comprise tokens ordered sequentially in time. However, according to another example, an input sequence of tokens for a set of classification labels associated with present medical conditions of a patient may benefit from an alternate ordering, such as ordering the tokens based at least in part on how common the medical conditions are, their risk, or their cost. According to various embodiments of the present disclosure, an input sequence of tokens may be generated from predictive output data and fed into an embedding machine learning model to generate, for each token of the input sequence of tokens, a token embedding.

The term "token embedding" may refer to a data construct that describes a numerical representation of a token that may be expressed as a vector. A numerical representation of a token may comprise a quantification of the token's category, and relationship, such as a semantic relationship respect to, for example, tokens in an index of predefined classification labels. Furthermore, an embedding machine learning model may be used to generate token embeddings such that data (e.g., corresponding to classification labels associated with output from a predictive system or a predictive machine learning model) represented by the token embeddings may be interpreted or accepted by machine learning models that receive input as low-dimensional numerical data. According to various embodiments of the present disclosure, a token embedding may be generated by an embedding machine learning model for each token in an input sequence of tokens.

The term "token embedding matrix" may refer to a data construct that describes a plurality of token embeddings corresponding to an input sequence of tokens. A token embedding matrix may be generated by an embedding machine learning model by concatenating a plurality of token embeddings associated with a given input sequence of tokens. A token embedding matrix may comprise a first dimension associated with an embedding size and a second dimension associated with a quantity of tokens associated with an input sequence of tokens. The embedding size may be a configurable variable that determines a number of dimensions of a vector space that the tokens are embedded to. According to various embodiments of the present disclosure, a mutation machine learning model may receive, as input, an input sequence of tokens in the form of a token embedding matrix, e.g., generated by an embedding machine learning model.

The term "embedding machine learning model" may refer to a data construct that describes parameters, hyperparameters, and/or defined operations of a machine learning model that is configured to generate token embeddings and concatenate the token embeddings into a token embedding matrix. According to various embodiments of the present disclosure, an embedding machine learning model may generate token embeddings for each token of an input sequence of tokens (e.g., wherein the input sequence of tokens comprises a tokenization of a plurality of classification labels associated with predictive output data from a predictive system), concatenate each token embedding into a token embedding matrix, and provide the token embedding matrix as input to a mutation machine learning model. In one embodiment, an embedding machine learning model may also be configured to convert predictive output data files of a given data type or file format, such as text files, audio files, image files, to name a few, into token embeddings. For example, a numerical representation, e.g., a vector, may be generated for data files by referencing an index of predefined classification labels.

The term "mutation" may refer to an operation performed by a mutation machine learning model on potentially faulty predictive output data of predictive systems. As an example, a mutation or result of mutation may comprise a modification to predictive output data. Modifying the predictive output data via mutation may comprise generating an output matrix, comprising an output sequence of tokens, by using a token embedding matrix of an input sequence of tokens. The output matrix is representative of a revision to the predictive output data by, for example, adding, deleting, or replacing one or more of a plurality of classification labels comprised in the predictive output data. In one embodiment, a mutation machine learning model may perform a mutation via sequence transformation. In one embodiment, the sequence transformation may be based at least in part on an encoder-decoder architecture where a token embedding matrix (e.g., associated with predictive output data) is encoded into a hidden state vector and an output matrix is generated by decoding the hidden state vector. According to various embodiments of the present disclosure, performing a mutation may further comprise retrieving one or more output classification labels associated with an output sequence of tokens determined from an output matrix (e.g., generated by a mutation machine learning model based at least in part on a token embedding matrix), where the one or more output classification labels may be retrieved based at least in part on a de-tokenization of the output sequence of tokens according to an index of predefined classification labels.

The term "output matrix" may refer to a data construct that describes an output, generated by a mutation machine learning model, representative of a mutation of a token embedding matrix associated with an input sequence of tokens. In particular, an output matrix may comprise a plurality of vectors representative of an output sequence of tokens generated by using an input sequence of tokens as a basis for mutation. An output sequence of tokens may be determined from an output matrix, and one or more output classification labels may be retrieved based at least in part on a de-tokenization of the output sequence of tokens according to an index of predefined classification labels. According to various embodiments of the present disclosure, a mutation machine learning model may generate an output matrix, comprising an output sequence of tokens, by using a token embedding matrix of an input sequence of tokens that is provided as input to the mutation machine learning model, where the input sequence of tokens is associated with predictive output data of a predictive system. As such, the output matrix may be representative of a mutation of predictive output data. In one embodiment, the output matrix may be generated according to a sequence transformation of a token embedding matrix. The sequence transformation may comprise a process to recreate the token embedding matrix based at least in part on the mutation machine learning model's interpretation of what the token embedding matrix represents. As an example, an encoder-decoder architecture may be employed to perform a sequence transformation to encode the token embedding matrix into a hidden state vector and recreate the token embedding matrix in the form of an output matrix by decoding the hidden state vector. The hidden state vector may comprise neural network memory storing information on data observations (e.g., of the token embedding matrix). An output matrix may also comprise a first dimension associated with a quantity of all possible predictions based at least in part on an index of predefined classification labels and a second dimension associated with a quantity of predictions (e.g., classification labels) associated with an output sequence of tokens.

The term "output sequence of tokens" may refer to a data construct that describes a set of tokens comprising a series of integers determined from an output matrix. The set of tokens may represent a plurality of classification labels associated with a mutation of predictive output data from a predictive system. According to various embodiments of the present disclosure, an output sequence of tokens may be determined from an output matrix generated by a mutation machine learning model. For example, the output sequence of tokens may be de-tokenized by using an index of predefined classification labels such that one or more output classification labels representative of a revision to the predictive output data may be retrieved. An output sequence of tokens may be determined from an output matrix based at least in part on position values in a first dimension of the output matrix including a highest value for each position in a second dimension in the output matrix.

The term "mutation machine learning model" may refer to a data construct that describes parameters, hyperparameters, and/or defined operations of a machine learning model that is configured to generate an output matrix, comprising an output sequence of tokens, by using a token embedding matrix comprising an input sequence of tokens (e.g., associated with predictive output data). An output matrix generated by a mutation machine learning model may comprise a mutation of a token embedding matrix for revising predictive output data of a predictive system. For example, an output matrix may be representative of a revision to predictive output data by, for example, adding, deleting, or replacing one or more of a plurality of classification labels comprised in the predictive output data. As such, the output matrix may be representative of a mutation of predictive output data. The mutation machine learning model may comprise any machine learning model, such as a "Seq2Seq" machine learning model, capable of performing machine translation and/or self-attention functions. In particular, a mutation machine learning model may comprise a machine learning model configured to accept, for example, an input sequence of tokens and generate an output sequence of tokens. In one embodiment, a mutation machine learning model may generate an output matrix by performing a sequence transformation on a token embedding matrix comprising an input sequence of tokens. The sequence transformation may comprise a process to recreate the token embedding matrix based at least in part on the mutation machine learning model's interpretation of what the token embedding matrix represents. As an example, an encoder-decoder architecture may be employed where the token embedding matrix is encoded into a hidden state vector and an output matrix is generated by decoding the hidden state vector. The sequence transformation may comprise using a hidden state vector of a token embedding matrix to recreate the token embedding matrix in the form of an output matrix. The hidden state vector may comprise neural network memory storing information on data observations (e.g., of the token embedding matrix). A hidden state vector may be created by using an encoder comprising a recurring neural network (RNN), long short-term memory (LSTM), or other suitable kinds of artificial neural networks. In one embodiment, a hidden state vector may be created by imparting the mutation machine learning model with a plurality of training sequence of tokens pairs, each training sequence of tokens pair comprising a training input sequence of tokens and a training output sequence of tokens. As an example, the mutation machine learning model may be trained with examples of faulty input sequences of tokens and corrective output sequences of tokens. At each training step, the mutation machine learning model may be given a faulty input sequence of tokens and attempt to produce a corrective output sequence of tokens. In one embodiment, faulty input sequences of tokens and corrective output sequences of tokens may comprise tokens associated with an index of predefined classification labels. According to certain embodiments, the mutation machine learning model may generate a first token of the output sequence of tokens, use the first token to generate a second token of the output sequence of tokens, and iteratively use one or more previously generated tokens to generate subsequent tokens of the output sequence of tokens. In certain situations, a mutation machine learning model may generate an output matrix comprising an output sequence of tokens identical to an input sequence of tokens, and determine that mutation of predictive output data is unnecessary, hence no corrective would be needed, resulting in no changes to classification labels of the predictive output data.

III. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to revise predictions, provide the revised predictions to the client computing entities 102, and automatically perform prediction-based actions based at least in part on the revised predictions.

An example of a prediction-based action that can be performed using the predictive data analysis system 101 is a request for validating predictions, such as concepts contained in input data, generated by predictive systems. For example, in accordance with various embodiments of the present disclosure, a predictive data analysis computing entity may be configured to be highly general and applicable in any domain and used to revise predictive output data, comprising a plurality of classification labels, of predictive systems including predictive machine learning models. The disclosed prediction validation machine learning model framework may be configured to process classification labels in the form of tokens within a mutation process to produce a revised set of classification labels. Accordingly, original potentially faulty predictive output data may be revised to corrected predictive output data using a mutation machine learning model. If there are no errors in the original predictive output data, the mutation machine learning model may output the original predictive output data as-is. This technique will lead to higher accuracy of performing predictive operations as needed on certain sets of predictive output data. In doing so, the techniques described herein improve efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training predictive machine learning models.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate revised predictions corresponding to the predictive data analysis requests, provide the revised predictions to the client computing entities 102, and automatically perform prediction-based actions based at least in part on the revised predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Exemplary Predictive Data Analysis Computing Entity

FIG. 2 provides a schematic of a predictive data analysis computing entity 106 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

B. Exemplary Client Computing Entity

FIG. 3 provides an illustrative schematic representative of a client computing entity 102 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

As described below, various embodiments of the present disclosure make important technical contributions to improving predictive accuracy of predictive systems, which use predictive machine learning models, by validating and revising predictive output data of the predictive systems with respect to a subset of classification levels from a fixed set of classification labels that are relevant to a given context (e.g., domain, application, system, concept, subject matter, etymology), which in turn improves training speed and training efficiency of training predictive machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training predictive machine learning models.

FIG. 4 is a flowchart diagram of an example process 400 for processing predictive system output. Via the various steps/operations of the process 400, the predictive data analysis computing entity 106 can use a prediction validation machine learning framework to revise predictive output generated by predictive systems.

The process 400 begins at step/operation 402 when the predictive data analysis computing entity 106 receives predictive output data from a predictive system. The predictive output data may comprise a set of predictions generated by the predictive system based at least in part on prediction input data. According to various embodiments of the present disclosure, the predictive output data may comprise a plurality classification labels representative of concepts relevant to a context associated with prediction input data provided to the predictive system. As an example, shopping history (representative of prediction input data) of a customer may be provided to a demographic predictor (predictive system) to predict demographics (predictive output data) of the customer. In this example, the predicted demographics may comprise a plurality of classification labels, such as "aged 30-40," "single," "male," and "active."

However, as described herein, in accordance with various embodiments of the present disclosure, the predictive data analysis computing entity 106 may be configured to be highly general and applicable in any domain and used to revise predictive output data, comprising a plurality of classification labels, of predictive systems including predictive machine learning models. The disclosed prediction validation machine learning model framework may be configured to process classification labels in the form of tokens within a mutation process to produce a revised set of classification labels. Accordingly, original potentially faulty predictive output data may be revised to corrected predictive output data using a mutation machine learning model. If there are no errors in the original predictive output data, the mutation machine learning model may output the original predictive output data as-is. This technique will lead to higher accuracy of performing predictive operations as needed on certain sets of predictive output data. In doing so, the techniques described herein improve efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training predictive machine learning models.

An operational example of a predictive data processing system 500 is depicted in FIG. 5. One or more components depicted in FIG. 5 may be embodied in predictive data analysis computing entity 106. As depicted in FIG. 5, in some embodiments, a prediction validation machine learning framework 508 receives predictive output data 506 from predictive system 504.

Predictive output data 506 may describe a prediction result generated by predictive system 504. The predictive output data 506 may comprise data representative of a set of predictions or forecasts of prediction input data 502. Predictive output data 506 may comprise one or more classification labels based at least in part on prediction input data 502. According to various embodiments of the present disclosure, predictive output data 506 may comprise a plurality of classification labels as a result of a process of predicting a class of data points from prediction input data 502. The process may comprise, for example, approximating a mapping function $f$ from input variables x to discrete output variables y.

An example of predictive output data 506 may comprise a set of predictions, made by a natural language-based predictive model, of billable items from an optical character recognition scan of a handwritten order. According to another example, predictive output data 506 may comprise diagnoses, such as medical codes, e.g., International Statistical Classification of Diseases and Related Health Problems (ICD) codes, Current Procedural Terminology (CPT) codes, prescription (RX) codes that are generated as classification output of electronic medical records data or medical document files. Other examples of predictive output data 506, applicable to a plurality of applications, industries, and domains, are described further herewith.

In some embodiments, prediction input data 502 comprises data received and used by a predictive system 504 to generate predictive output data 506. In one embodiment, the prediction input data 502 may comprise historical or existing data that is analyzed by a predictive system 504 to predict one or more classification labels representative of a context of the prediction input data 502.

Predictive system 504 may comprise a computing system or apparatus comprising at least one processor and at least one memory including program code, wherein the at least one memory and the program code are configured to, with the processor, cause the computing system or apparatus to at least generate predictive output data 506 for given prediction input data 502. Generating predictive output data 506 by the predictive system 504 may comprise for example, predicting one or more classes or concepts of data, from the prediction input data 502, whose classification labels are unknown. In some embodiments, predictive system 504 may analyze prediction input data 502 to create a predictive machine learning model that can be used to generate predictive output data 506. The predictive machine learning model may be trained to predict, categorize, or identify missing or unavailable data from given prediction input data.

In some embodiments, a predictive machine learning model describes parameters, hyperparameters, and/or defined operations of a machine learning model that is configured to generate predictive output data for given prediction input data. According to various embodiments of the present disclosure, a predictive machine learning model may receive prediction input data 502 and perform a predictive inference, such as predicting a class (e.g., assigning classification labels) associated with data points from the prediction input data 502. For example, a predictive machine learning model may generate a predictive inference associated with ICD codes based at least in part on data from a medical visit data record. A predictive machine learning model may comprise a data object created by using machine learning to learn to perform a given function (e.g., a prediction) through training with a training dataset. For example, training process may formulate a mapping function ƒ from input variables x to discrete output variables y. A predictive machine learning model may be trained to generate predictive output data 506 by learning from a training dataset. A training dataset may (e.g., supervised learning via labeled data) or may not (e.g., unsupervised learning via unlabeled data) include classification labels that characterize data in the training dataset. As such, a predictive machine learning model may learn known (e.g., supervised) or unknown (e.g., unsupervised) relationships or patterns from a training dataset.

In some embodiments, a classification label describes a label that associates target features, properties, or characteristics to data. For example, a classification label may be generated as output from predictive system 504 or a predictive machine learning model for describing a prediction on prediction input data 502. Classification labels may be applied to various kinds of data types such as images, text, audio, video files, and application files that may be used to, for example, train a machine learning model. In some embodiments, classification labels may comprise descriptions, tags, or identifiers that classify or emphasize features present in training data entries which may be analyzed by machine learning models for relationships or patterns to perform a predictive inference.

Prediction validation machine learning framework 508 may comprise parameters, hyperparameters, and/or defined operations of a machine learning model that is configured to process predictive output data 506 from predictive systems. The prediction validation machine learning framework 508 may receive an input sequence of tokens comprising a tokenization of a plurality of classification labels from predictive output data 506 of predictive system 504. The plurality of classification labels may be tokenized based at least in part on an index of predefined classification labels. The prediction validation machine learning framework 508 may generate a mutation of the input sequence of tokens, where one or more prediction-based actions may be performed based at least in part on revised predictive output data 510 comprising one or more output classification labels based at least in part on the mutation of the input sequence of tokens.

Returning to FIG. 4, at step/operation 404, the predictive data analysis computing entity 106 generates an input sequence of tokens. In some embodiments, a token describes a representation of a classification label comprising a unique identifier according to a mapping based at least in part on an index of predefined classification labels. The set of tokens may comprise a tokenization of a plurality of classification labels, where the tokenization is performed based at least in part on an index of predefined classification labels.

Accordingly, in some embodiments, via performing step/operation 404, the predictive data analysis computing entity 106 tokenizes the plurality of classification labels from the predictive data output based at least in part on an index of predefined classification labels. In some embodiments, tokenizing or tokenization may refer to an operation that converts a given classification label into a token by using a mapping based at least in part on an index of predefined classification labels. In particular, a tokenized classification label may be represented as a unique identifier according to the mapping. The unique identifier may comprise one or more integers and/or characters. For example, a unique identifier may be formatted according to one or more integer values, binary values, or hexadecimal values. According to various embodiments of the present disclosure, each unique classification label belonging to a defined universal set of classification labels may be assigned a unique identifier in an index of predefined classification labels. That is, each instance of a given classification label is associated with a single unique identifier.

An operational example of an input sequence of tokens 602 comprising a plurality of predictions (e.g., classification labels) is depicted in FIG. 6. As depicted in FIG. 6, in some embodiments, each prediction in the input sequence of tokens 602 may correspond to a value in an index of predefined classification labels. The values associated with each prediction may be used to tokenize the predictions to create the input sequence of tokens 602.

In some embodiments, an index of predefined classification labels describes a reference of mappings between classification labels and unique identifiers. For example, an index of predefined classification labels may comprise a lookup table for a defined set of classification labels used by a predictive system. According to various embodiments of the present disclosure, an index of predefined classification labels may define a token key for a set of classification labels for which predictive output data is generated from with respect to given prediction input data. An index of predefined classification labels may be used to tokenize classification labels associated with predictive output data In some embodiments, an input sequence of tokens may comprise a set of tokens that are arranged in a specific order. For example, depending on the nature of given classification labels, some intuitive orderings may be used to arrange tokens within a given input sequence of tokens. As such, if a set of classification labels are events in time, a corresponding input sequence of tokens may comprise tokens ordered sequentially in time. However, according to another example, an input sequence of tokens for a set of classification labels associated with present medical conditions of a patient may benefit from an alternate ordering, such as ordering the tokens based at least in part on how common the medical conditions are, their risk, or their cost.

Returning to FIG. 4, at step/operation 406, the predictive data analysis computing entity 106 generates, using a prediction validation machine learning framework, a mutation of the input sequence of tokens. According to various embodiments of the present disclosure, the prediction validation machine learning framework may comprise a mutation machine learning model. In some embodiments, a mutation describes an operation performed by the mutation machine learning model on potentially faulty predictive output data of predictive systems. The mutation machine learning model may be trained using a training set of data including, for example, training input sequences of tokens and corresponding correct output sequences of tokens.

Mutation of the predictive output data may comprise generating an output matrix, comprising an output sequence of tokens, by using a token embedding matrix of the input sequence of tokens. The output matrix may be representative of a revision to the predictive output data by, for example, adding, deleting, or replacing one or more of a plurality of classification labels comprised in the predictive output data.

An operational example of performing a mutation of an input sequence of tokens is depicted in FIG. 7. An input sequence of tokens 602 is provided to prediction validation machine learning framework 702. According to the illustrated example, an input sequence of tokens 602 is representative of a set of predictions (e.g., classification labels) for a shopper's demographics based at least in part on the shopper's shopping history. The prediction validation machine learning framework 702 may comprise one or more machine learning models trained to embed the input sequence of tokens 602 and mutate the input sequence of tokens 602 into an output sequence of tokens 704. As depicted in FIG. 7, in some embodiments, a prediction 706 ("Aged 30-40") in the input sequence of tokens 602 is replaced with revised prediction 708 (Aged "20-30") in the output sequence of tokens 704, and as well as a new prediction 710 is added ("Lives in Seattle") in the output sequence of tokens 704.

Returning to FIG. 4, at step/operation 408, the predictive data analysis computing entity 106 performs one or more prediction-based actions based at least in part on the mutation of the input sequence of tokens. A prediction-based action may comprise functionality provided by a system depending on predictive output generated by a predictive system and revised by the disclosed predictive data analysis computing entity. As an example, a prediction-based action may comprise actions performed by billing or accounting software (e.g., generating bill data, creating and sending invoice files) based at least in part on a revision (according to various embodiments disclosed herewith) to a set of predictions of billable items contained in a handwritten order performed by a predictive system that is configured to scan the handwritten order. According to another example, a prediction-based action may comprise generating alerts by a manufacturing system based at least in part on a validation of an identification of defect codes contained in a natural language review performed by a predictive system. In yet another example, a prediction-based action may comprise generating medical codes based at least in part on a validation of diagnoses identified from medical documentation by a predictive system. In some embodiments, performing the one or more prediction-based actions includes displaying revised/validated predictions using a prediction output user interface.

FIG. 8 is a flowchart diagram of an example process 800 for mutating an input sequence of tokens. Via the various steps/operations of the process 800, the predictive data analysis computing entity 106 can use a prediction validation machine learning framework to process an input sequence of tokens and generate a mutation of the input sequence of tokens. According to various embodiments of the present disclosure, the prediction validation machine learning framework may comprise an embedding machine learning model and a mutation machine learning model.

The process 800 begins at step/operation 802 when the predictive data analysis computing entity 106 generates, via an embedding machine learning model, for each token of the input sequence of tokens, a token embedding. The input sequence of tokens may comprise a tokenization of a plurality of classification labels associated with predictive output data from a predictive system. In some embodiments, the input sequence of tokens may describe a set of tokens comprising a series of integers that may be provided to the embedding machine learning model to generate the token embeddings.

In some embodiments, a token embedding describes a numerical representation of a token that may be expressed as a vector. A numerical representation of a token may comprise a quantification of the token's category, and relationship, such as a semantic relationship respect to, for example, tokens in an index of predefined classification labels.

An operational example of embedding machine learning model 900 is depicted in FIG. 9. As depicted in FIG. 9, in some embodiments, tokens associated with an input sequence of tokens are provided to embedding machine learning model 900 as integers. The tokens may comprise a tokenization of a plurality of predictions based at least in part on an index of predefined classification labels. Embedding machine learning model 900 generates a token embedding for each token. Each token embedding may comprise a vectorized representation of the token based at least in part on the token's categorization and relationship with respect to, for example, tokens in an index of predefined classification labels.

In one embodiment, the embedding machine learning model may also be configured to convert predictive output data files of a given data type or file format, such as text files, audio files, image files, to name a few, into token embeddings. For example, a numerical representation, e.g., a vector, may be generated for data files by referencing an index of predefined classification labels.

Returning to FIG. 8, at step/operation 804, the predictive data analysis computing entity 106 concatenates, using the embedding machine learning model, each token embedding into a token embedding matrix. In some embodiments, a token embedding matrix describes a plurality of token embeddings corresponding to an input sequence of tokens. A token embedding matrix may comprise a first dimension associated with an embedding size and a second dimension associated with a quantity of tokens associated with an input sequence of tokens. The embedding size may be a configurable variable that determines a number of dimensions of a vector space that the tokens are embedded to. According to various embodiments of the present disclosure, the mutation machine learning model may receive, as input, an input sequence of tokens in the form of the token embedding matrix.

An operational example of a mutation workflow 1000 is depicted in FIG. 10. As depicted in FIG. 10, in some embodiments, an input sequence of tokens 1002 is provided to embedding machine learning model 1004 to generate a token embedding matrix 1006. The embedding machine learning model 1004 may be used to generate the token embedding matrix 1006 such that the input sequence of tokens 1002 (e.g., corresponding to classification labels associated with output from a predictive system or a predictive machine learning model) may be processed in a format (token embeddings) suitable for the mutation machine learning model 1008.

Returning to FIG. 8, at step/operation 806, the predictive data analysis computing entity 106 generates, using a mutation machine learning model, an output matrix, comprising an output sequence of tokens, by using the token embedding matrix. The mutation machine learning model may comprise any machine learning model, such as a "Seq2Seq" machine learning model, capable of performing machine translation and/or self-attention functions. In particular, a mutation machine learning model may comprise a machine learning model configured to accept, for example, an input sequence of tokens and generate an output sequence of tokens. In some embodiments, an output matrix describes an output, generated by a mutation machine learning model, representative of a mutation of a token embedding matrix associated with an input sequence of tokens. In particular, an output matrix may comprise a plurality of vectors representative of an output sequence of tokens that is generated by using an input sequence of tokens as a basis for mutation. An output matrix may also comprise a first dimension associated with a quantity of all possible predictions based at least in part on an index of predefined classification labels and a second dimension associated with a quantity of predictions (e.g., classification labels) associated with an output sequence of tokens.

In one embodiment, a mutation machine learning model may generate an output matrix by performing a sequence transformation on a token embedding matrix comprising an input sequence of tokens. The sequence transformation may comprise a process to recreate the token embedding matrix based at least in part on the mutation machine learning model's interpretation of what the token embedding matrix represents. As an example, an encoder-decoder architecture may be employed where the token embedding matrix is encoded into a hidden state vector and an output matrix is generated by decoding the hidden state vector. The sequence transformation may comprise using a hidden state vector of a token embedding matrix to recreate the token embedding matrix in the form of an output matrix. The hidden state vector may comprise neural network memory storing information on data observations (e.g., of the token embedding matrix).

A hidden state vector may comprise neural network memory storing information on data observations (e.g., of the token embedding matrix). A hidden state vector may be created by using an encoder comprising a recurring neural network (RNN), long short-term memory (LSTM), or other suitable kinds of artificial neural networks. In one embodiment, a hidden state vector may be created by imparting the mutation machine learning model with a plurality of training sequence of tokens pairs, each training sequence of tokens pair comprising a training input sequence of tokens and a training output sequence of tokens. As an example, the mutation machine learning model may be trained with examples of faulty input sequences of tokens and corrective output sequences of tokens. At each training step, the mutation machine learning model may be given a faulty input sequence of tokens and attempt to produce a corrective output sequence of tokens. In one embodiment, faulty input sequences of tokens and corrective output sequences of tokens may comprise tokens associated with an index of predefined classification labels.

In one embodiment, the mutation of the token embedding matrix provides for revising predictive output data of a predictive system. For example, an output matrix may be representative of a revision to predictive output data by, for example, adding, deleting, or replacing one or more of a plurality of classification labels comprised in the predictive output data. According to various embodiments of the present disclosure, a mutation machine learning model may generate an output matrix, comprising an output sequence of tokens, by using a token embedding matrix of an input sequence of tokens that is provided as input to the mutation machine learning model, where the input sequence of tokens is associated with predictive output data of a predictive system. As such, the output matrix may be representative of a mutation of predictive output data.

According to certain embodiments, the mutation machine learning model may generate a first token of the output sequence of tokens, use the first token to generate a second token of the output sequence of tokens, and iteratively use one or more previously generated tokens to generate subsequent tokens of the output sequence of tokens. In certain situations, a mutation machine learning model may generate an output matrix comprising an output sequence of tokens identical to an input sequence of tokens, and determine that mutation of predictive output data is unnecessary, hence no corrective would be needed, resulting in no changes to classification labels of the predictive output data.

An operational example of a mutation machine learning model workflow 1100 is depicted in FIG. 11. As depicted in FIG. 11, in some embodiments, the mutation machine learning model 1102 is configured to receive token embedding matrix 1006. Token embedding matrix 1006 may comprise an embedding representative of an input sequence of tokens associated with predictive output data generated by a predictive system. The token embedding matrix 1006 may comprise a dimension 1106 associated with an embedding size and a dimension 1108 associated with a quantity of tokens associated with an input sequence of tokens. The embedding size may be a configurable variable that determines a number of dimensions of a vector space that the tokens are embedded to.

The mutation machine learning model 1102 may be trained to mutate the token embedding matrix 1006 into output matrix 1104 based at least in part on training data to correct faulty input sequences of tokens. The output matrix 1104 may comprise a dimension 1110 and a dimension 1112. Dimension 1110 may be associated with a quantity of all possible predictions based at least in part on an index of predefined classification labels. Dimension 1112 may be associated with a quantity of predictions associated with an output sequence of tokens. The quantity of predictions may be based at least in part on tokens associated with an input sequence of tokens.

Returning to FIG. 8, at step/operation 808, the predictive data analysis computing entity 106 retrieves one or more output classification labels associated with the output sequence of tokens based at least in part on an index of predefined classification labels. According to various embodiments of the present disclosure, the one or more output classification labels may be retrieved based at least in part on a de-tokenization of the output sequence of tokens by using the index of predefined classification labels. In one embodiment, the index of predefined classification labels may comprise a mapping of classification labels to unique identifiers that may be used to de-tokenize the output sequence of tokens. For example, output classification labels may be retrieved based at least in part on integer values in the index of predefined classification labels. The one or more output classification labels may be representative of a result of revision to predictive output data based at least in part on a mutation of an input sequence of tokens performed by a mutation machine learning model.

An output sequence of tokens may be determined from an output matrix based at least in part on position values in a first dimension of the output matrix including a highest value for each position in a second dimension in the output matrix. An operational example of an output matrix is depicted in FIG. 12. As depicted in FIG. 12, in some embodiments, the position of a token in an output sequence of tokens 1202 corresponds to the position in dimension 1112, and the value of a token in an output sequence of tokens 1202 corresponds to the position in dimension 1110.

For example, a first token value may be determined by locating the highest value in a first column of output matrix 1104, represented by a first position in dimension 1112, which is '0.021.' A position in dimension 1110 (ranging from '0' to '4') that corresponds to the highest value ('0.021') for the given position in dimension 1112 is used to determine the value of the first token, which in this case is '2'. Similarly, highest values in dimension 1110 for tokens corresponding to second, third, and fourth positions in dimension 1112, provide tokens '4,' '1,' and '0' in the output sequence of tokens 1202.

The tokens may be de-tokenized by using an index of predefined classification labels to retrieve, for example, classification labels corresponding to the tokens. In one embodiment, the index of predefined classification labels may comprise a mapping of classification labels to unique identifiers that may be used to de-tokenize the output sequence of tokens. For example, output classification labels may be retrieved based at least in part on integer values in the index of predefined classification labels.

Accordingly, as described above, various embodiments of the present disclosure make important technical contributions to improving predictive accuracy of predictive systems, which use predictive machine learning models, by validating and revising predictive output data of the predictive systems with respect to a subset of classification levels from a fixed set of classification labels that are relevant to a given context (e.g., domain, application, system, concept, subject matter, etymology), which in turn improves training speed and training efficiency of training predictive machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training predictive machine learning models.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
    receiving, by a computing device and originating from a predictive system, predictive output data, the predictive output data comprising a plurality of classification labels;
    generating, by the computing device, an input sequence of tokens, the input sequence of tokens comprising a tokenization of the plurality of classification labels based at least in part on a numerical index of predefined classification labels;
    generating, by the computing device and using a prediction validation machine learning framework, a mutation of the input sequence of tokens, wherein:
        the prediction validation machine learning framework comprises an embedding machine learning model and a mutation machine learning model, wherein:
            (i) the embedding machine learning model is configured to (a) generate, for each token of the input sequence of tokens, a token embedding, and (b) concatenate each of the token embedding into a token embedding matrix,
            (ii) the mutation machine learning model is configured to generate an output matrix, comprising an output sequence of tokens, based at least in part on the token embedding matrix,
            (iii) the mutation of the input sequence of tokens comprises retrieval of one or more output classification labels associated with the output sequence of tokens based at least in part on the numerical index of predefined classification labels; and
    performing, by the computing device, one or more prediction-based actions based at least in part on the mutation of the input sequence of tokens.

2. The computer-implemented method of claim 1, wherein training the mutation machine learning model comprises imparting the mutation machine learning model with a plurality of training sequence of tokens pairs, each training sequence of tokens pair comprising a training input sequence of tokens and a training output sequence of tokens.

3. The computer-implemented method of claim 1, wherein the mutation machine learning model comprises a sequence-to-sequence machine learning model.

4. The computer-implemented method of claim 1, wherein the token embedding matrix comprises a first dimension associated with an embedding size and a second dimension associated with a quantity of tokens associated with the input sequence of tokens.

5. The computer-implemented method of claim 1, wherein the output matrix comprises a first dimension associated with a quantity of possible predictions based at least in part on the numerical index of predefined classification labels and a second dimension associated with a quantity of predictions associated with the output sequence of tokens.

6. The computer-implemented method of claim 5, wherein the output sequence of tokens is based at least in part on position values in the first dimension including a highest value for each position in the second dimension.

7. The computer-implemented method of claim 6, the one or more output classification labels are based at least in part on integer values in the numerical index of predefined classification labels.

8. The computer-implemented method of claim 1, wherein the numerical index of predefined classification labels comprises a set of classification labels mapped to integer values.

9. A system comprising
one or more processors and
one or more non-transitory computer readable media storing processor-executable instructions that, when executed by the one or more processors, cause the one or more processors to perform operations comprising:
receiving predictive output data from a predictive system, the predictive output data comprising a plurality of classification labels;
generating an input sequence of tokens, the input sequence of tokens comprising a tokenization of the plurality of classification labels based at least in part on a numerical index of predefined classification labels;
generating, using a prediction validation machine learning framework, a mutation of the input sequence of tokens, wherein:
the prediction validation machine learning framework comprises an embedding machine learning model and a mutation machine learning model, wherein:
(i) the embedding machine learning model is configured to (a) generate, for each token of the input sequence of tokens, a token embedding, and (b) concatenate each of the token embedding into a token embedding matrix,
(ii) the mutation machine learning model is configured to generate an output matrix, comprising an output sequence of tokens, based at least in part on the token embedding matrix,
(iii) the mutation of the input sequence of tokens comprises retrieval of one or more output classification labels associated with the output sequence of tokens based at least in part on the numerical index of predefined classification labels; and
performing one or more prediction-based actions based at least in part on the mutation of the input sequence of tokens.

10. The system of claim 9, wherein training the mutation machine learning model comprises imparting the mutation machine learning model with a plurality of training sequence of tokens pairs, each training sequence of tokens pair comprising a training input sequence of tokens and a training output sequence of tokens.

11. The system of claim 9, wherein the mutation machine learning model comprises a sequence-to-sequence machine learning model.

12. The system of claim 9, wherein the token embedding matrix comprises a first dimension associated with an embedding size and a second dimension associated with a quantity of tokens associated with the input sequence of tokens.

13. The system of claim 9, wherein the output matrix comprises a first dimension associated with a quantity of possible predictions based at least in part on the numerical index of predefined classification labels and a second dimension associated with a quantity of predictions associated with the output sequence of tokens.

14. The system of claim 13, wherein the output sequence of tokens is based at least in part on position values in the first dimension including a highest value for each position in the second dimension.

15. The system of claim 14, the one or more output classification labels are based at least in part on integer values in the numerical index of predefined classification labels.

16. The system of claim 9, wherein the numerical index of predefined classification labels comprises a set of classification labels mapped to integer values.

17. One or more non-transitory computer-readable storage media storing instructions that, when executed by one or more processors, cause the one or more processors to perform operations comprising:
receiving predictive output data from a predictive system, the predictive output data comprising a plurality of classification labels;
generating an input sequence of tokens, the input sequence of tokens comprising a tokenization of the plurality of classification labels based at least in part on a numerical index of predefined classification labels;
generating, using a prediction validation machine learning framework, a mutation of the input sequence of tokens, wherein:
the prediction validation machine learning framework comprises an embedding machine learning model and a mutation machine learning model, wherein:
(i) the embedding machine learning model is configured to (a) generate, for each token of the input sequence of tokens, a token embedding, and (b) concatenate each of the token embedding into a token embedding matrix,
(ii) the mutation machine learning model is configured to generate an output matrix, comprising an output sequence of tokens, based at least in part on the token embedding matrix,
(iii) the mutation of the input sequence of tokens comprises retrieval of one or more output classification labels associated with the output sequence of tokens based at least in part on the numerical index of predefined classification labels; and
performing one or more prediction-based actions based at least in part on the mutation of the input sequence of tokens.

18. The one or more non-transitory computer-readable storage media of claim 17, wherein the output matrix comprises a first dimension associated with a number of possible predictions based at least in part on the numerical index of predefined classification labels and a second dimension associated with a quantity of predictions associated with the output sequence of tokens.

19. The one or more non-transitory computer-readable storage media of claim 18, wherein the output sequence of tokens is based at least in part on position values in the first dimension including a highest value for each position in the second dimension.

20. The one or more non-transitory computer-readable storage media of claim 19, wherein the one or more output classification labels are based at least in part on integer values in the numerical index of predefined classification labels.

* * * * *